(12) United States Patent
Thorp

(10) Patent No.: X4491
(45) Date of Patent: Jul. 10, 1826

(54) BRAIDING

(76) Inventor: John Thorp

John Thorp Letters Patent dated July 11 1826.

The schedule referred to in these Letters Patent & making part of the same, containing a description in the words of the said John Thorp himself of his improvement on his Braiding Machine Patented on the 10th day of August 1821. —

---

These improvements consist first of "carrier wheels" being an inner row of wheels confined to the cog-wheels & being wheels on which the carriers ride, and by which they are moved or forced round in their proper route. — They are convex on one side & concave on the other, forming a curve, corresponding with the circle on which they stand. — The rim or edge of these wheels is bevelled coming nearly to an edge at the concave surface of one and the convex surface of another, or they have a projecting lip [illegible] [illegible] one half the thickness of each wheel; so that the rims can be lapped [illegible] each other thereby allowing a deeper notch for the connecting bars of the carriers to lie in, & securing the carriers more safely in their places. —

The two plates of the carriers are permanently connected each to the other by two connecting bars. — Said carriers are so constructed as to receive & hold a spool or bobbin, with the shaft or body of the spool or bobbin lying parallel with the plates of the carriers allowing the threads to run in a straight line from the spool or bobbin to the feeding rollers, where the braid is formed.

The second improvement is an "encircling rim", encompassing the carrier wheels — the use of which is to check the centrifugal inclination of the carriers & to prevent them from flying off from said wheels. — The surface of this rim is [illegible] corresponding with the curve of the carrier wheels & with the circle on which the carrier wheels are placed. The inner edge of the rim comes so near to the outer edge of the carrier wheel as to admit of no more play to the connecting bars of the carriers while they lie in said notches than that of ..

[illegible] being moved within the space between the wheels & said [illegible]. [illegible] are supported by arms or [illegible] extending from the frame of the machine.

The third improvement is a reel attached to the machine for the purpose of [illegible] the braid & assisting the feeding rollers in bringing it forward. Said reel receives its motion from a band passing over a [illegible] belonging & confined to the shaft [illegible] said feeding rollers.

[illegible] this 17th day of June A.D. 1836.

John Thorp

Witnesses
Charles C. [illegible]
Jm. [illegible] Staples

[illegible] Jan. [illegible] 1846

Exd. [illegible]

[illegible]

2—328 a.

DRAFTSMAN'S DIVISION.

*All communications should be addressed to*
"The Commissioner of Patents.
Washington, D. C."

*DEPARTMENT OF THE INTERIOR,*

United States Patent Office,

*Washington, D. C.,* ............, 189...

*SIR:*

*The printed* copies *of Patent No.* J Thorp July 10 1826 are *exhausted.*

*As soon as printed a copy will be mailed you to complete your order.*

*By direction of the Commissioner:*

*Very respectfully,*

*Chief Clerk.*

314316-97-5m